(12) United States Patent
Wallner et al.

(10) Patent No.: US 9,760,532 B2
(45) Date of Patent: Sep. 12, 2017

(54) METHOD FOR EVALUATING THE SOLUTION TO A MULTICRITERIA OPTIMIZATION PROBLEM

(71) Applicant: AVL LIST GMBH, Graz (AT)

(72) Inventors: Klemens Wallner, Graz (AT); Alejandra Garcia, Graz (AT); Adnand Dragoti, Graz (AT)

(73) Assignee: AVL List GmbH, Graz (AT)

( * ) Notice: Subject to any disclaimer, the term of this patent is extended or adjusted under 35 U.S.C. 154(b) by 193 days.

(21) Appl. No.: 14/364,514

(22) PCT Filed: Nov. 8, 2012

(86) PCT No.: PCT/EP2012/072165
§ 371 (c)(1),
(2) Date: Jun. 11, 2014

(87) PCT Pub. No.: WO2013/087307
PCT Pub. Date: Jun. 20, 2013

(65) Prior Publication Data
US 2014/0344320 A1    Nov. 20, 2014

(30) Foreign Application Priority Data

Dec. 12, 2011 (AT) .................................. 1820/2011

(51) Int. Cl.
| | | |
|---|---|---|
| *G06F 17/10* | (2006.01) | |
| *G06F 17/11* | (2006.01) | |
| *F02D 41/14* | (2006.01) | |
| *G05B 13/02* | (2006.01) | |
| *G06T 11/20* | (2006.01) | |
| *G06F 17/50* | (2006.01) | |

(52) U.S. Cl.
CPC .......... *G06F 17/11* (2013.01); *F02D 41/1406* (2013.01); *G05B 13/024* (2013.01); *G05B 13/0265* (2013.01); *G06T 11/206* (2013.01); *G06F 17/5095* (2013.01); *G06F 2217/08* (2013.01)

(58) Field of Classification Search
None
See application file for complete search history.

(56) References Cited

U.S. PATENT DOCUMENTS

| | | | |
|---|---|---|---|
| 6,417,852 B2 | 7/2002 | Sevastyanov | |
| 6,954,908 B2 | 10/2005 | Subasic et al. | |
| 7,921,371 B1 | 4/2011 | Roubtsov et al. | |
| 2004/0111679 A1* | 6/2004 | Subasic | G06F 17/504 716/101 |
| 2009/0326881 A1 | 12/2009 | Anai et al. | |

FOREIGN PATENT DOCUMENTS

EP    2192294    6/2010

* cited by examiner

*Primary Examiner* — Michael D Yaary
(74) *Attorney, Agent, or Firm* — Dykema Gossett PLLC

(57) ABSTRACT

Solving a multidimensional multicriteria optimization problem is difficult because the correlations and dependencies between solutions, target functions, and variation variables can be detected only with difficulty. In order to facilitate this, it is proposed that a model space (1) and a variation space (2) are displayed simultaneously and in an interactively linked fashion.

17 Claims, 1 Drawing Sheet

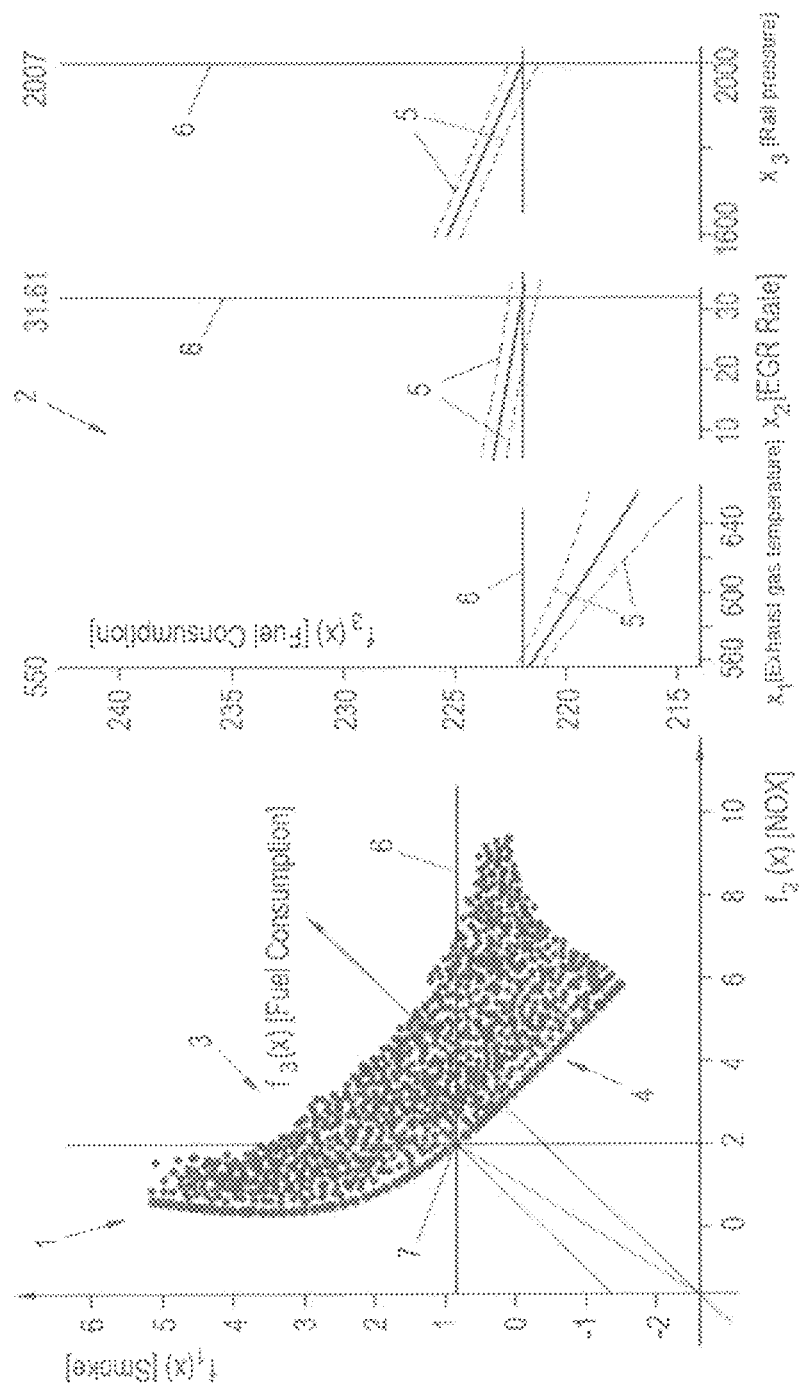

METHOD FOR EVALUATING THE SOLUTION TO A MULTICRITERIA OPTIMIZATION PROBLEM

The present invention relates to a method for evaluating the solution to a multicriteria optimization problem.

In the calibration of vehicle control units (xCU), for example engine control units ECU or transmission control units TCU, on test strands for vehicles and components as well as in test runs, the calibration engineer is routinely faced with the task of optimizing a compromise between different target variables. Problems in which target variables of multiple target functions are to be simultaneously optimized as a function of multiple constraints are widespread in practice, in particular in calibration. Examples include the NOx-soot compromise, or the NOx-soot-fuel consumption compromise in classical internal combustion engine drives, or the battery damage-fuel consumption compromise in hybrid applications, or the compromise between sporty and comfortable coordination of the shifting operations in transmissions. In general, as the result of drive designs having automatic transmissions and/or hybridization, the individual components in vehicles are subject to increasingly conflicting requirements, which must be represented in the form of a compromise and optimized. Such multicriteria optimization problems generally are present when target variables of multiple target functions are to be simultaneously optimized as a function of multiple constraints (such as boundary conditions, physical limits, etc.).

However, when there is a conflict of objectives among target functions, simultaneously optimizing all target functions is frequently problematic. In particular, in such multicriteria optimization problems it is generally not possible to find unique solutions; instead, only a set of possible multidimensional solution points in a multidimensional space, i.e., a multidimensional surface, the so-called Pareto front, which all represent an optimal compromise for the multicriteria optimization problem, can be found. Single points of this Pareto front therefore represent different, but in each case optimal, compromises between the target functions. Such multicriteria optimization problems are known per se, and there are numerous mathematical methods for solving such problems.

A method is known from EP 2 192 294 A1, for example, via which an ECU is optimized in ongoing operation by means of a multicriteria optimization problem with regard to an exhaust gas-soot-fuel consumption compromise. An individual aggregate objective function (AOF) is used which combines the weighted target functions into a functional relationship. The linearly weighted summation of the target functions described here represents a common solution. Each target function is provided with a weighting factor from which a scalar target function is derived as a sum. In this regard, the actual optimization may be carried out using conventional approaches, for example by means of sequential quadratic programming (SQP), an effective iterative method for nonlinear limited optimization which is required for the desired reduction in the necessary computing power. However, the meaningfulness of such an optimization depends greatly on the selection of the weighting factors, which, however, in many cases cannot be reliably defined in advance, so that the results of such an optimization are not always satisfactory, or at best, this method is usable only for a limited group of optimization problems.

Another difficulty with multicriteria optimization problems lies in visualizing and displaying the found solution in such a way that a simple, meaningful analysis of the solution is possible. Two- and three-dimensional correlations are still detectable by humans. However, this generally involves multidimensional correlations, so that for evaluation of the results of the multicriteria optimization, approaches must be found which enable a simple yet meaningful evaluation. In particular, there is the task of selecting a specific compromise from the found compromises as the ultimate solution of the optimization problem. In this regard, it is particularly difficult to detect the correlations of the individual target functions and the variation variables in the found solution. In this case as well, there are known methods and approaches for solving this problem.

U.S. Pat. No. 7,921,371 B1 describes a method for visualizing the solution of a multidimensional multicriteria optimization problem. All target variables are displayed on parallel adjacent axes, in each case the smallest and the largest value of the found optimal solution, which represent the overall possible range of optimal solutions for a target variable, being visualized. Thus, the Pareto front is displayed in the form of parallel axes for the number of target variables. For each target variable there is a fixed target value, which likewise is displayed in the diagram, the parallel axes being vertically shifted in such a way that the target values are all aligned on a horizontal line. The upper and lower limits of the individual target variables may now be varied by a user, whereby at the same time, all ether axes are also influenced; i.e., only the solutions which meet the limits of a target variable which are selected by the user are displayed. The user thus obtains the option for analyzing the correlations between the individual target variables, and thus, selecting a compromise from the set of all possible compromises (Pareto front).

In addition, a method is known from WO 01/67395 A1 in which, in a display of ail possible optimal solutions, the solutions which meet a certain criterion specified by the user, such as a boundary condition, are marked (in this case, by a different color). The solutions are projected onto two- or three-dimensional surfaces to enable recognition of correlations. Target variables (dependent variables) as well as variation variables (independent variables) are displayed. Thus, the solution set may be limited in a targeted manner and visually displayed, which likewise allows correlations to be analyzed and recognized. However, this method allows only very generalized conclusions to be drawn, and does not permit a detailed analysis of the solution of a multicriteria optimization problem.

It is therefore an object of the present invention to provide a method for visualizing and analyzing the solution of a multicriteria optimization problem, which allows a simple yet detailed evaluation of the found solutions, and thus the selection of one of the found optimal solutions as the solution of the multicriteria optimization problem.

This object is achieved according to the invention in that the set of optimal solutions of the multicriteria optimization problem is displayed in a model space as a two- or three-dimensional diagram of the target functions, and at the same time, at least one of the target functions is displayed in a variation space as a function of at least one variation variable, and the model space and the variation space are interactively linked by marking, for each selected solution in the model space, the variation variable in the variation space upon which the solution is based. This type of preparation and representation of the multicriteria optimization problem by displaying the optimal solutions of the multicriteria optimization problem together with the variation variables allows a simple and meaningful graphical analysis of the solutions of the multicriteria optimization problem, with the objective of selecting a solution as the best possible compromise. Coupling the graphical views of the variation space and the model space results in a particularly high informative value in the analysis of multicriteria optimization problems. Thus, individual variation variables may be analyzed with regard to their optimally and dependency on other variation variables.

In one preferred embodiment, as the target function a mathematical model may be used which is determined from a number of measurements of the target function as a function of the variation variables. This allows the method according to the invention to be used for practically any given optimization problem.

It is very particularly advantageous to additionally display a model confidence interval in the variation space for the target function, by means of which the solutions may be simultaneously assessed with regard to the particular associated model confidence interval.

Better overall calibration results may thus be obtained, and in addition the calibration operation may be carried out in a partially automated manner, i.e., in a cost- and time-effective manner, and not least, in a convenient and reproducible manner.

BRIEF DESCRIPTION OF THE FIGURE

The present invention is explained below with reference to the attached FIG. 1, which schematically shows the divided display of a model space and a variation space in accordance with the invention.

DETAILED DESCRIPTION OF THE INVENTION

Problems involving finding target variables which simultaneously optimize, as a rule minimize, multiple target functions as a function of multiple constraints are referred to as multicriteria optimization problems (MOP). The mathematical description of the problem is as follows:

$$(MOP) \begin{cases} \min/\max_{x}(f_1(x), f_2(x), \ldots, f_k(x)) \\ g_i(x) \leq 0 \ i=1, \ldots, m \\ x_{min} \leq x \leq x_{max} \end{cases}$$

where $f_j(x)$, with $j=1, \ldots, k$, represents the target function which is to be minimized or maximized. This optimization should take place with consideration of constraints $g_i$ as well as for a limited range $x_{min}$, $x_{max}$ of the variation variables $x=\{x_1, \ldots x_n\}$.

The variation variables x are present in the variation space, which is understood to mean the n-dimensional space (where n is the number of variation variables) that is spanned by the variation variables x. The variation variables x are, for example, the settings on a test stand, for example, at which the calibrator performs his measurements during a calibration. Since these variation variables x represent valid points in the variation space, the calibrator knows that he may adjust the variation variables x in this range. For this reason, in this variation space an envelope, referred to as a design space, is placed around the variation variables x. The design space thus contains all variation variables x which are valid for the particular application.

When the target functions $f_j$ are involved in a mutual conflict of objectives, as is usually the case, it is difficult to simultaneously minimize all target functions $f_j$. For this reason, the concept of non-dominating individuals has been introduced. A point in the target function space X* is referred to as a non-dominating individual if there is no valid solution within the design space for which the following apply:

$$\forall = 1, \ldots, k / f_j(x) \leq f_j(x^*) \qquad \text{a)}$$

$$\exists j \in \{1,2, \ldots, k\} / f_j(x) < f_j(x), \qquad \text{b)}$$

in other words, if it is not possible to improve the point in one of the target functions $f_j$ without adversely affecting one of the other target functions. As is known and customary, for a multicriteria optimization problem not just one such solution, but, rather, a set of possible solutions, referred to as the Pareto front, exists.

Many theoretical approaches for solving such multicriteria optimization problems exist; however, not all known methods result in good solutions in the approximation to the Pareto front.

An individual aggregate objective function (AOF), as described in EP 2 182 284 A1, for example, is likely the most intuitive approach to solving multicriteria optimization problems. In contrast, evolutionary algorithms for multicriteria optimization require no weightings or a priori information, so that these methods, which have proven to be particularly effective and robust, have seen increasing use in recent years, in particular genetic algorithms, based on selection, recombination, and mutation, which achieve a continuous approximation to a desired objective have been used. Genetic algorithms are readily applied to a wide variety of problems, and are very robust in the search for global optima, even when multiple local optima exist. In multicriteria optimization, a set of compromise solutions which approximate the best possible solutions is sought for requirements in conflict with one another. The quality of an approximation may be quantified by the volume in the target space, the S-metric, which the approximation dominates. Maximizing the S-metric is a desirable objective, and at the same time is an adequate scalar substitute for the original target function. A genetic algorithm inserts this S-metric within the selection, and thereby achieves excellent results. In particular when more than three objectives are to be optimized where other multicriteria genetic algorithms fail. Currently, the most popular genetic algorithm for determining the Pareto front is the Non-Dominated Sorting Genetic Algorithm (NSGA-II), which has proven to be extremely efficient in particular for determining a preferably global optimum. NSGA-II is a high-performance, elitist algorithm which prioritizes non-dominating individuals and preserves the diversity of the solutions. The algorithm creates an initial population within the vector of variation variables x, and in an iterative process based on selection, crossing, and mutation operations makes a closer approximation with each new generation by favoring non-dominating individuals (elitism) until a solution criterion is met. Such genetic algorithms by their nature are relatively computationally intensive, but may be easily parallelized for current multi-core processors and distributed computing architectures. Since these algorithms are known per se, they are not addressed in greater detail here, in particular due to the fact that the selected method for solving the multicriteria optimization problem has no influence on the preparation and analysis of the results according to the invention.

To allow the result of the multicriteria optimization to be evaluated (independently of the selected solution algorithm), use is made of a special type of preparation and display of the variables used. This evaluation is described below on the basis of a graphical analysis.

The special feature of the visual preparation lies in a divided display of the model space 1 and the variation space 2, as illustrated in FIG. 1. The model space 1 is the k-dimensional space spanned by the k target functions $f_j(x)$, j=1, ..., k. In the example according to FIG. 1, this is, for example, the three-dimensional space spanned by the target functions f1(x) "Smoke," f2(x; "NOX," and f3(x) "Fuel consumption." The mapping of the design space into this model space 1 is the valid range 3 within which the solutions may range. The Pareto front 4 contains the found solutions of the multicriteria optimization problem within this valid range 3.

If the model space 1 has a dimension higher than three, the model space 1 may also be represented by multiple two- or three-dimensional displays of the k dimensions of the model space. Which of the k dimensions are combined in the various two- or three-dimensional displays may be made a function of the multicriteria optimization problem and the preference of the user.

The variation space 2 is represented by a number of two- or three-dimensional displays of target functions $f_j(x)$ and variation variables x. In the example according to FIG. 1, the target function $f_3(x)$ is illustrated in each case as a function of the three variation variables $x_1$ "Exhaust gas temperature." $x_2$ "EGR rate," and $x_3$ "Rail pressure." However, any arbitrary combinations of target functions $f_j(x)$ and variation variables x are conceivable here.

The target functions $f_j(x)$ may be known functions of the venation variables x. However, it is also conceivable for a target function $f_j(x)$ to be a mathematical model which is determined from measurements or tests. Measurements are carried out on the object of the multicriteria optimization problem, for example an internal combustion engine, a drive train, a transmission, a vehicle, etc., on appropriate test stands or in the course of test runs. The desired target functions $f_j$ are measured as a function of the variation variables x and possibly other variables. Mathematical models of the target functions $f_j$ are then created from these measured variables. To this end, there are likewise a number of known methods by means of which the best possible coverage with the fewest possible measurements may be achieved in order to obtain the best possible mathematical models. Examples of possible models include a polynomial regression model, a fast neural network, or an intelligent neural network. As a result of this procedure, additional measurements, i.e., actual measured values, do not necessarily have to be present with 100% accuracy in this model. The methods for determining the models therefore also provide a model confidence interval which indicates the bandwidth in which further measurements most likely range. This means that a model having a narrow model confidence interval fits the conducted measurements relatively well and has correspondingly good informative value. The narrower the model confidence interval, the better the fit of the model to the measurements, and the more likely that the solutions of the multicriteria optimization problem determined using the models are actually the sought values. Of course, known target functions $f_j(x)$ may also have a model confidence interval which in turn indicates how precisely a target function $f_j$ matches an actual measurement. The model confidence interval is thus a measure of the accuracy of the model or of a target function based on actual measurements.

Therefore, in the individual diagrams the model confidence intervals 5 may also be displayed in the variation space 2, for example in the form of an upper and lower limit, as is apparent in FIG. 1.

The special feature of this type of display is that the target functions $f_j(x)$ in the model space 1 and the Pareto front 4 may thus be displayed as the set of possible optimal solutions of the multicriteria optimization problem together with the variation variables x, and may therefore also be analyzed together. The display in the variation space 2 is interactively adapted to a selection of a point in the model space 1. For this purpose crosshairs 6, for example, are provided, via which, for example, a point 7 of interest of the Pareto front 4 or of the valid range 3 is selected. In the variation space 2 the crosshairs 5 automatically mark the variation variables x for this point 7 in the model space 1. At the same time, the particular values of the variation variables x may also be indicated in this point, as shown in FIG. 1. The model confidence interval 5 may likewise be displayed, so that the user also obtains information concerning the confidence in the underlying target function $f_j$ (or mathematical model) at this point. Of course, once models are developed, they may also be used for subsequent tasks.

The coupling of the graphical views of the variation space 2 and the model space 1 results in a particularly high informative value in the analysis of multicriteria optimization problems. Thus, individual variation variables x may be assessed not only with regard to their optimality and dependency en other variation variables x, but at the same time, also with regard to the particular associated model confidence interval 5. Thus, the option has been provided for analyzing the solution set in detail in order to determine the actual best possible compromise between the target functions $f_j(x)$.

However, this type of display also allows analysis of the influences of changes in the input of the constraints $g_i$ and/or of the range $x_{min}$, $x_{max}$ of the variation variables x. Such changes result in other solutions, which may then be easily directly compared to one another. For this purpose it may be provided, for example, to change the limits of the range of the variation variables x, for example by means of a slider in the variation space 2, which at the same time allows a change in the display of the solution in the model space 1. Likewise, it could be provided to filter the solutions in the model space 1 in such a way that only solutions which meet the specified ranges of one or more variation variables x are displayed. Such influences are easier to detect due to the coupled display and the interactivity of the display.

Due to the complexity of the computations which are necessary in this regard, it is advantageous to distribute the software architecture of the method according to the invention in such a way that complex tasks may be parallelized. Individual tasks may thus be executed in parallel on different processors or also on different computers. This distributed multicriteria optimization allows the user to carry out his optimization tasks in a high-performance and high-quality manner in any given scalable distributed system. This increase in the performance, together with the coupled visualization of the variation space 2 and the model space 1, also allows greatly enhanced informative value in the analysis of multicriteria optimization problems.

One possible calibration sequence for an engine control unit ECU of an internal combustion engine with regard to the NOx-soot-fuel consumption is described below as an example of multicriteria optimization. Initially, a number of measurements are carried out on the internal combustion engine, the target variables of the target functions $f_j(x)$ NOx, soot, and fuel consumption being measured as a function of the variation variables x, for example exhaust gas temperature, EGR rate, and rail pressure. The number and sets of the measurements may be predefined by a predetermined design of experiments, for example. Mathematical models and model confidence intervals 5 for the target functions $f_j(x)$ are determined based on the measurements. The multicriteria optimization problem for optimizing the target functions $f_j(x)$ may be subsequently solved, and the solution analyzed in the divided display of the model space 1 and the variation space 2. The calibrator may test various optimal solutions of the Pareto front 4 with regard to the underlying variation variables x and the model confidence interval 5. Based on these possible optimal solutions, the calibrator then determines one of the solutions as the best possible compromise. The experience of the calibrator plays a major role in this regard. For this purpose, in addition to the model confidence intervals and the dependencies of the variation variables x, it is possible to take into account the values of additional model channels which have not been optimized as target functions, as well as the robustness of the settings, for example whether the model changes greatly in the vicinity of the optimum, or low susceptibility to influence due to component tolerances, etc. This may be repeated for all operating points (speed, torque, load, for example) of the internal combustion engine which are necessary for the calibration. A predefined number of operating points, for example 10 to 20 operating points, is generally required for a calibration.

The invention claimed is:

1. A method for calibrating a control unit of an internal combustion engine, the method comprising:
   optimizing a plurality of target functions that include $NO_x$ target function, soot target function and fuel consumption target function and which are a function of variation variables of a multicriteria optimization problem, the multicriteria optimization problem providing a set of possible optimal solutions as a result,
   evaluating the possible optimal solutions of the multicriteria optimization problem to select one of the possible optimal solutions as a selected solution for calibration,
   wherein, during the evaluating, the set of possible optimal solutions of the multicriteria optimization problem is displayed in a model space as a two- or three-dimensional diagram of the plurality of target functions, and at the same time at least one of the plurality of target functions is displayed in a variation space as a function of at least one variation variable, and
   wherein the model space and the variation space are interactively linked by marking, for each selected solution in the model space, the variation variable in the variation space upon which the selected solution is based.

2. The method according to claim 1, generating a mathematical model from a number of measurements of the variation variables.

3. The method according to claim 1, wherein a model confidence interval is additionally displayed in the variation space for the at least one target function.

4. The method according to claim 1, wherein the plurality of target functions includes at least three target functions.

5. A method of calibrating a control unit of an internal combustion engine, the method comprising:
   (a) conducting a test run of the internal combustion engine to obtain measurements of a plurality of variation variables;
   (b) generating models for a plurality of target functions that include $NO_x$ target function, soot target function and fuel consumption target function, according to the measurements of the plurality of variation variables;
   (c) determining a multicriteria optimization problem according to the plurality of target functions;
   (d) determining a plurality of possible solutions to the multicriteria optimization problem;
   (e) displaying, simultaneously, a combined display including a model space and a variation space, the model space including the plurality of possible solutions and the variation space including the plurality of variation variables;
   (f) selecting a selected solution according to the combined display; and
   (g) calibrating the control unit according to the selected solution.

6. The method of claim 5, wherein at least one of the model space and the variation space includes crosshairs for selecting a point of interest.

7. The method of claim 5, wherein the selected solution corresponds to an operating point of the internal combustion engine.

8. The method of claim 7, comprising repeating steps (a)-(f) to determine a plurality of solutions for a plurality of operating points of the internal combustion engine.

9. The method of claim 8, wherein the plurality of operating points includes at least 10 operating points.

10. The method of claim 8, wherein each of the plurality of operating points includes a speed value, a torque value, and a load value.

11. The method of claim 8, comprising calibrating the control unit according to the plurality of solutions.

12. A method for calibrating a vehicle control unit for an internal combustion engine, the method comprising:
    optimizing a plurality of target functions which are a function of variation variables of a multicriteria optimization problem, the variation variables including exhaust gas temperature, EGF, rate, and rail pressure, the multicriteria optimization problem providing a set of possible optimal solutions as a result,
    evaluating the possible optimal solutions of the multicriteria optimization problem to select one of the possible optimal solutions as a selected solution for calibration,
    wherein, during the evaluating, the set of possible optimal solutions of the multicriteria optimization problem is displayed in a model space as a two- or three-dimensional diagram of the plurality of target functions, and at the same time at least one of the plurality of target functions is displayed in a variation space as a function of at least one variation variable, and
    wherein the model space and the variation space are interactively linked by marking, for each selected solution in the model space, the variation variable in the variation space upon which the selected solution is based.

13. The method of claim 5, comprising determining a model confidence interval for each of the models.

14. The method of claim 13, comprising displaying the model confidence intervals in the variation space.

15. The method of claim 5, wherein the variation space automatically changes according to a selection of a point in the model space.

16. The method according to claim 12, wherein the plurality of target functions includes a NOx target function, a soot target function, and a fuel consumption target function.

17. A method of calibrating a control unit of an internal combustion engine, the method comprising:
- (a) conducting a test run of the internal combustion engine to obtain measurements of a plurality of variation variables that include exhaust gas temperature, EGR rate and rail pressure;
- (b) generating models for a plurality of target functions according to the measurements of the plurality of variation variables;
- (c) determining a multicriteria optimization problem according to the plurality of target functions;
- (d) determining a plurality of possible solutions to the multicriteria optimization problem;
- (e) displaying, simultaneously, a combined display including a model space and a variation space, the model space including the plurality of possible solutions and the variation space including the plurality of variation variables;
- (f) selecting a selected solution according to the combined display; and
- (g) calibrating the control unit according to the selected solution.

\* \* \* \* \*